(12) United States Patent
Minard et al.

(10) Patent No.: US 6,892,899 B2
(45) Date of Patent: May 17, 2005

(54) PASSIVE SYRUP DELIVERY SYSTEM

(75) Inventors: James J. Minard, South Beloit, IL (US); Pete McNamee, Beloit, WI (US); Mark Bush, Rockton, IL (US)

(73) Assignee: Carrier Commerical Refrigeration, Inc., Syracuse, NY (US)

( * ) Notice: Subject to any disclaimer, the term of this patent is extended or adjusted under 35 U.S.C. 154(b) by 189 days.

(21) Appl. No.: 10/312,313

(22) PCT Filed: Oct. 16, 2002

(86) PCT No.: PCT/US02/32989
§ 371 (c)(1),
(2), (4) Date: Dec. 16, 2002

(65) Prior Publication Data
US 2004/0074393 A1 Apr. 22, 2004

(51) Int. Cl.[7] .................................. A23G 9/28
(52) U.S. Cl. .................... 222/1; 222/63; 222/108; 222/145.5; 222/333; 222/494; 137/846
(58) Field of Search ................. 222/108, 109, 222/145.5, 145.6, 146.6, 333, 490, 494, 1, 63; 137/515, 846

(56) References Cited

U.S. PATENT DOCUMENTS

| | | | |
|---|---|---|---|
| 996,588 A | * | 6/1911 | Kennedy ................ 137/515.7 |
| 3,118,468 A | * | 1/1964 | Bochan ..................... 137/846 |
| 4,645,093 A | | 2/1987 | Jones |
| 4,881,663 A | | 11/1989 | Seymour |
| 5,531,156 A | * | 7/1996 | Brummett ................. 99/450.1 |
| 6,189,736 B1 | * | 2/2001 | Phallen et al. ............... 222/52 |

FOREIGN PATENT DOCUMENTS

| | | |
|---|---|---|
| EP | 0701777 | 3/1996 |
| JP | 01171438 | 7/1989 |

OTHER PUBLICATIONS

International Search Report Dated Jun. 30, 2003.

* cited by examiner

Primary Examiner—Kenneth Bomberg
(74) Attorney, Agent, or Firm—Carlson, Gaskey & Olds

(57) ABSTRACT

A pump transfers syrup through a supply line and through a valve assembly for mixing with ice cream in a mixing chamber to form a frozen dessert or milkshake. When the syrup flows through the passive valve, the pressure along the supply line increases. When syrup delivery is complete, a first timer is initiated to dispense ice cream into the mixing chamber for 0.4 seconds to flush out any remaining syrup. A second timer is also initiated when the syrup delivery is complete to reverse the pump for 0.2 seconds to remove the residual pressure in the supply line. By removing the residuals pressure, syrup in the supply line is prevented from oozing out of the valve apparatus and into the mixing chamber.

22 Claims, 2 Drawing Sheets

PASSIVE SYRUP DELIVERY SYSTEM

BACKGROUND OF THE INVENTION

Syrup delivery systems are employed to deliver syrup which flavors milkshakes and other frozen desserts. The syrup is delivered from the syrup delivery system to a mixing chamber for mixing with softened ice cream. The syrup and the ice cream mixture is then dispensed from the mixing chamber and served.

In the prior art, a user presses a button to select a desired flavor on a control panel. A draw handle is opened to initiate the flow of the ice cream into the mixing chamber. A syrup valve controls the flow of syrup into the mixing chamber. A solenoid opens to send air pressure from an air compressor to the syrup valve. The air moves a plunger in the syrup valve away from the syrup valve tip, allowing syrup from a syrup container to dispense through the syrup valve. The syrup then mixes with the ice cream in the mixing chamber to produce the milkshake or the frozen dessert.

The frozen dessert is dispensed into a cup. When a pyroelectric sensor detects a temperature change at the top of the cup, the syrup flow is stopped. The ice cream continues to flow into the mixing chamber for a preset amount of time to flush out any remaining syrup in the mixing chamber. If any syrup remains in the mixing chamber, it can disflavor the next milkshake or frozen dessert.

A drawback to the prior art syrup delivery system is the flavored syrup in the supply line from the syrup container can ooze out of the valve assembly and into the mixing chamber after the system is turned off. When a different flavor is selected, the extra syrup which can mix with the new flavor, altering the flavor of the frozen dessert. Additionally, the syrup valve is not flexible and does not allow the flow of syrups including particulates through the syrup valve.

SUMMARY OF THE INVENTION

A pump transfers syrup from a syrup container through a supply line and through a valve assembly for mixing with ice cream in a mixing chamber to form a flavored milkshake or a frozen dessert.

The valve assembly includes a passive valve which is received in a first body portion. The passive valve has a slot that aligns with an opening in the first body portion to allow for the exit of syrup from the valve assembly. A second body portion is threaded on the first body portion to retain the passive valve in the valve assembly. Preferably, the first body portion and the second body portion are made of stainless steel and the passive valve is made of an elastomer. An annular groove in the first body portion receives an o-ring to aid in the sealing of the valve assembly in the mixing chamber.

When the syrup flows through the passive valve, the syrup pressure opens the slot, allowing syrup to flow. As syrup flows through the valve assembly, the pressure in the supply line increases due to the resistance caused by the valve assembly.

When a sensor detects the cup is full, a first timer and a second timer are simultaneously initiated to stop the flow of ice cream into the mixing chamber and to prevent the syrup in the supply line from oozing in the mixing chamber. A first timer sends a signal to the ice cream source to continue to dispense ice cream into the mixing chamber for 0.4 seconds to flush out any remaining syrup. A second timer sends a signal to the pump to stop forward motion and to reverse the pump for 0.2 seconds. The reversal of the pump removes the residual pressure in the supply line, preventing any syrup in the supply line from oozing out of the valve apparatus and into the mixing chamber. The syrup stops flowing through the passive valve and the slot closes, creating a self-seal that prevents the syrup from flowing into the mixing chamber.

Alternately, the valve assembly includes a passive valve positioned on the end of a body portion. The passive valve includes an integrated o-ring. When the valve assembly is assembled in the system, the o-ring of the passive valve contacts an annular protrusion of the body portion, creating a seal between the body portion and the mixing chamber. The passive valve is retained on the body portion by an interference fit.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawing that accompany the detailed description can be briefly described as follows.

DETAILED DESCRIPTION OF THE PREFERRED EMBODIMENT

Figure 1:
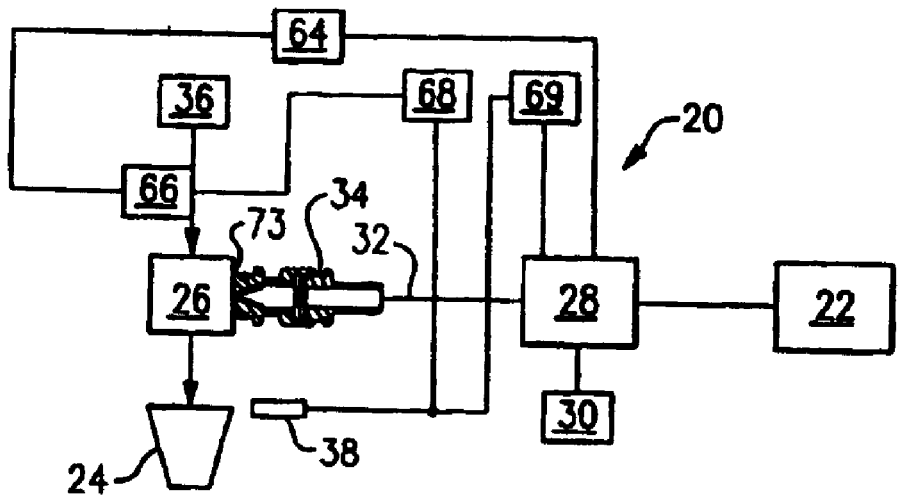
FIG. 1 schematically illustrates the passive syrup delivery system of the present invention.

FIG. 1 schematically illustrates the syrup delivery system 20 of the present invention. Flavored syrup is stored in a syrup container 22. The syrup can contain particulates, such as fruit. An operator places a cup 24 under a mixing chamber 26 and presses a flavor button indicating a desired flavor. A pump 28 having a motor 30 pumps the syrup from the syrup container 22 through a supply line 32 and through a valve assembly 34. In one example, the pump 28 is a peristaltic pump. The syrup exits the valve assembly 34 and enters the mixing chamber 26 for mixing with ice cream from an ice cream source 36. A portion of the valve assembly 34 is positioned in an opening 73 in the mixing chamber 26 such that the syrup from the valve assembly 34 directly enters the mixing chamber 26. The valve assembly 34 is secured to the mixing chamber 26 by a mechanical fastener, such as a pin (not shown). The mixed frozen dessert is then dispensed into the cup 24. After a time delay, the draw handle 66 is closed to stop the flow of ice cream from the ice cream source 36.

The system 20 further includes a sensor 38 to sense when the cup 24 is full. In one example, the sensor 38 is a pyroelectric sensor positioned proximate to the top of the cup 24. When the sensor 38 detects a temperature change at the top of the cup 24, the cup 24 is full and the system 20 is turned off, ending the flow of syrup and ice cream to the mixing chamber 26. Alternately, the sensor 38 can be positioned at the bottom of the cup 24. When the sensor 38 detects the cup 24 and the system 20 is operated to dispense the frozen dessert, the syrup flow is programmed to stop after a predetermined amount of time. The sensor 38 can also be a dielectric sensor which senses resistance to an electric field. It is to be understood that other types of sensors 38 can be employed, and a worker skilled in the art would know what type of sensor 38 to employ.

Figure 2:
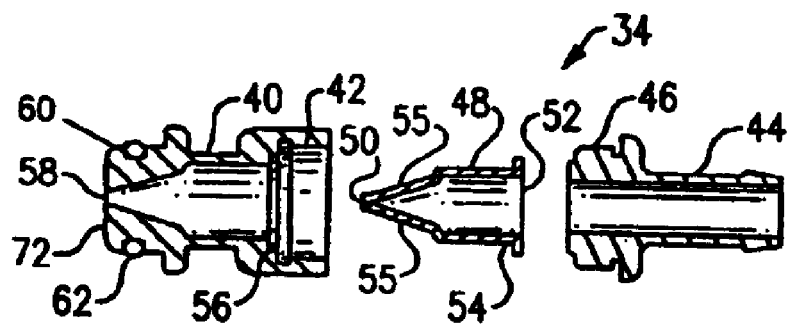
FIG. 2 schematically illustrates a cross-sectional exploded view of a first example valve assembly.
Figure 3:
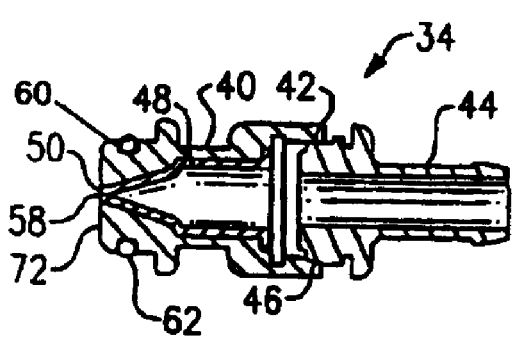
FIG. 3 schematically illustrates a cross-sectional view of the valve assembly of FIG. 2 assembled.

FIG. 2 illustrates the valve assembly 34 of the present invention. The valve assembly 34 includes a first body portion 40 having an internal threaded portion 42, a second body portion 44 having an external threaded portion 46, and a passive valve 48. Preferably, the first body portion 40 and the second body portion 44 are made of stainless steel and the passive valve 48 is made of an elastomer. The passive valve 48 is duckbill shaped and includes a slot 50 at one end and an opening 52 at the opposing end. The passive valve 48 is received in the first body portion 40 such that an annular flat surface 54 of the passive valve 48 contacts a corresponding flat surface 56 in the first body portion 40. The first body portion 40 further including an opening 58 which aligns with the slot 50 of the passive valve 48 to allow for exit of the syrup from the valve assembly 34. As shown in FIG. 3, the external threaded portion 46 of the second body portion 44 is threaded into the internal threaded portion 42 of the first body portion 40, securing the passive valve 48 in the valve assembly 34. The first body portion 40 further includes an annular groove 60 proximate to the opening 58 which receives an o-ring 62. The o-ring 62 provides a seal between the valve assembly 34 and the mixing chamber 26.

When syrup is being dispensed, the pump 28 transfers syrup from the syrup container 22, through the valve assembly 34 and into the mixing chamber 26. The syrup enters the passive valve 48 through the opening 52 and exits out of the slot 50. In the sealed position or when the syrup delivery system 20 is not on, the slot 50 is closed. When the syrup flows through the passive valve 48, the pressure along the supply line 32 increases due to the resistance cased by the valve assembly 34. The syrup pressure opens the slot 50, allowing syrup to flow into the mixing chamber 26.

When syrup delivery is complete and the syrup stops dispensing, the increase in the pressure in the supply line 32 from the resistance caused by the valve assembly 34 is removed by reversing the motor 30 of the pump 28. By eliminating the pressure, syrup is prevented from oozing into the mixing chamber 26 from the valve assembly 34 and from being drawn on the top of the frozen dessert in the cup 24. The reversal of the motor 30 eliminates the backpressure in the syrup line 32 and causes the valve assembly 34 to seal on itself. The walls 55 of the passive valve 48 collapse on each other, creating a self-seal. The passive valve 48 also prevents the backflow of the frozen dessert in the mixing chamber 26 into the passive valve 48 and into the syrup line 32.

Prior to frozen product being dispensed, a flavored syrup is selected. The syrup can be selected on a control panel 64. A draw handle 66 is opened to initiate the flow of ice cream from the ice cream source 36 and to begin the flow of syrup of the selected flavor into the mixing chamber 26 for mixing and dispensing. The mixed frozen dessert dispenses into the cup 24 during mixing. When the sensor detects a fill level at the top of the cup 24 indicating that the cup 24 is full, a first timer 68 and a second timer 69 are simultaneously initiated to prevent syrup in the supply line 32 from oozing through the valve assembly 34 and into the mixing chamber 26 and to stop the flow of ice cream from the ice cream source 36. This extra syrup can form a spot of concentrated syrup on the top of the frozen dessert in the cup 24 or can contaminate the next frozen dessert of a different flavor.

When the sensor 38 detects that the cup 24 is full, the first timer 68 sends a signal to the ice cream source 36 to dispense ice cream into the mixing chamber 26 for 0.4 seconds. The second timer 69 simultaneously sends a signal to the motor 30 of the pump 28 to stop forward motion and to reverse the motor 30 for a time set by a reverse time potentiometer. Preferably, the motor 30 is reversed for 0.2 seconds. The reversal of the motor 30 removes the residual pressure in the supply line 32, preventing any syrup in the supply line 32 from oozing out of the valve assembly 34 and into the mixing chamber 26.

The motor 30 of the pump 28 stops operating after 0.2 seconds. The ice cream continues to dispense from the ice cream source 36 for 0.2 seconds after the motor 30 stops operating to flush out any remaining syrup in the mixing chamber 26. Once the first timer 68 expires, the draw valve 66 closes, and the frozen dessert flow from the mixing chamber 26 stops. It is to be understood that other times can be employed for the timers 68 and 69, and one skilled in the art would know the length of time to run the timers 68 and 69.

Preferably, the first supply line 32 is made of stainless steel and does not deflect under pressure. As the supply line 32 is made of stainless steel, the diameter of the supply line 32 does not increase during syrup dispensing. If the supply line 32 increased in diameter, extra syrup would enter the supply line 32 equal to the additional volume create by the expansion of diameter. This extra syrup would also ooze out of the supply line 32. By making the supply line 32 of stainless steel, the diameter does not increase during syrup dispensing, and therefore additional syrup does not enter the supply line 32 and therefore the mixing chamber 26. Although stainless steel has been described, it is to be understood that the supply line 32 can be made of other materials.

Figure 4:
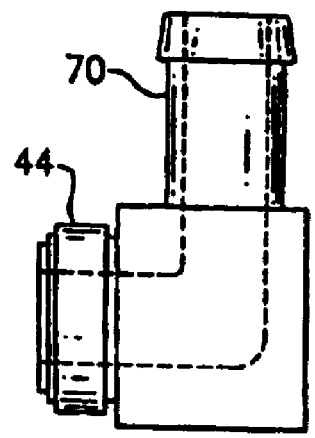
FIG. 4 schematically illustrates a side view of an alternate second body portion of the valve assembly of FIG. 2.

As shown in FIG. 4, the second body portion 44 alternately further includes an angled portion 70. Preferably, the angled portion 70 is angled approximately 90° from the second body portion 44. Including an angled portion 70 in the second body portion 44 can ease attachment of the supply line 32 to the valve assembly 34 in certain syrup delivery systems 20.

Figure 5:
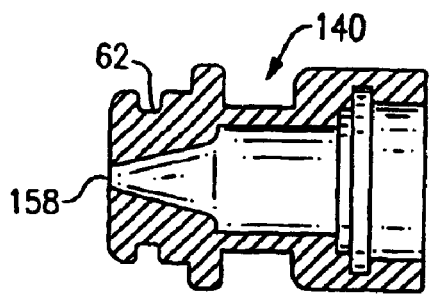
FIG. 5 schematically illustrates a cross-sectional side view of a first body portion having a small slot.
Figure 6:
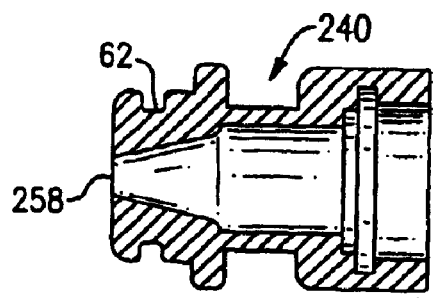
FIG. 6 schematically illustrates a cross-sectional side view of a first body portion having a large slot.

FIG. 5 illustrates the first body portion 140 having an opening 158 sized to allowing the flow of syrup through the opening 158. As shown in FIG. 6, the opening 258 of the first body portion 240 is increased in size to allow the flow of syrup containing particulate through the opening 258 of the first body portion 150. For example, the syrup includes fruit. The larger opening 258 allows the particulate in the syrup to flow out of the first body portion of the valve assembly 34.

Figure 7:
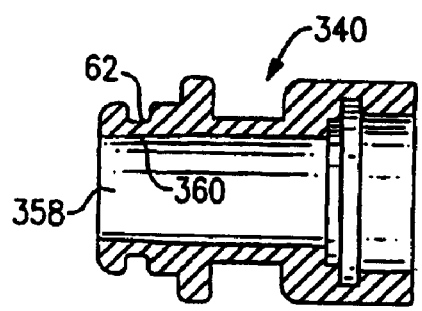
FIG. 7 schematically illustrates a front view of the valve assembly of FIG. 5.
Figure 8:
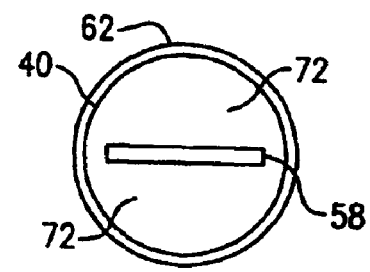
FIG. 8 schematically illustrates a cross-sectional side view of a first body portion having an opening.

As shown in FIG. 7, the opening 58 of the first body portion 40 is formed by a pair of walls 72. The walls 72 block the frozen dessert in the mixing chamber 26 from entering the valve assembly 34 during mixing, preventing further contamination of the syrup in the valve assembly 34. Alternately, as shown in FIG. 8, the first body portion 340 does not includes an opening formed by walls and includes an opening 358 formed by the cylindrical wall 360 of the first body portion 340.

Figure 9:
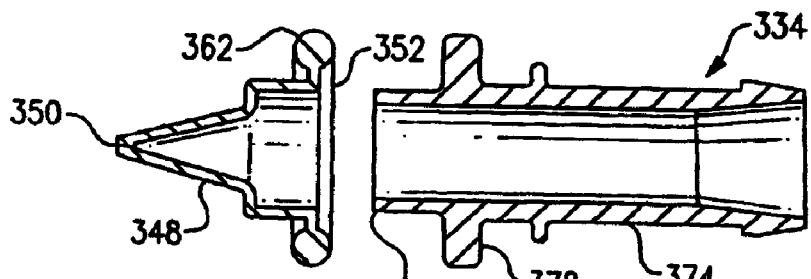
FIG. 9 schematically illustrates a cross sectional side view of a second example valve assembly.

FIG. 9 illustrates a valve assembly 334 including a passive valve 348 positioned on an end 376 of a body portion 374. The passive valve 348 includes an integrated o-ring 362 positioned around the exterior surface of the open end 352 of the passive valve 348. When assembling the passive valve 348 on the body portion 372, the o-ring 362 contacts an annular protrusion 378 of the body portion 372. The passive valve 348 is retained on the end 376 of the body portion 374 by an interference fit. When the valve assembly 334 is assembled in the mixing chamber 26, the passive valve 348 is positioned in the opening 73 in the mixing chamber 26 such that the syrup flowing through the slot 350 in the passive valve 348 flows directly into the mixing chamber 26. The o-ring 362 is positioned outside the opening 73, creating a seal between the annular protrusion 378 of the body portion 374 of the valve assembly 334 and the mixing chamber 26. By employing the valve assembly 334 of FIG. 10, the number of parts is eliminated as a second body portion is not needed.

Figure 10:
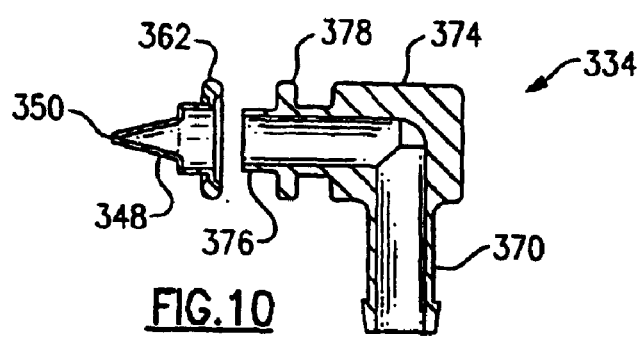
FIG. 10 schematically illustrates a side view of an alternate second body portion of the valve assembly of FIG. 9.

As shown in FIG. 10, the body portion 374 alternately further includes an angled portion 370. Preferably, the angled portion 370 is angled approximately 90° from the body portion 374. Including an angled portion 370 can ease attachment of the supply line 32 to the valve assembly 334 in certain systems 20.

The passive valve 48 of the present invention eliminates the need for air, spring, and mechanical actuations of the valve for flow of the syrup. The valve assembly 34 also eliminates the need for lubrication.

Although a motor 30 and a pump 28 has been illustrated and described, it is to be understood that other devices can be employed to remove the residual pressure from the supply line 32. Alternately, an accumulating chamber or an inline piston with a spring force less than the syrup supply pressure can be employed to remove the residual pressure.

Although only one syrup deliver system 20 has been illustrated and described, it is to be understood that multiple syrup delivery systems 20 can be employed. In one example, four syrup delivery systems 20 are employed. Each syrup delivery system 20 includes a flavored syrup which is dispensed when a user presses the button that selects the desired flavor on a control panel 64. In a system including more than one syrup delivery systems 20, the passive valves 48 can be integrated into one unit to reduce the number of parts.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fluid dispensing system comprising:
    a pump to pump a fluid through a supply line, and a pressure is applied to said supply line as said fluid flows through said supply line, said pump reversing after pumping said fluid to remove said pressure in said supply line;
    a valve assembly including a passive valve to dispense said fluid from said supply line; and
    a mixing chamber, and said fluid from said valve assembly flows into said mixing chamber.

2. The system as recited in claim 1 wherein said valve assembly further includes a first body portion having a body annular flat surface and a second body portion, and said passive valve includes a valve annular flat surface, wherein said passive valve is received in said first body portion, and said valve annular flat surface contacts said body annular flat surface, and said second body portion is attached to said first body portion to retain said passive valve in said first body portion and said second body portion.

3. The system as recited in claim 2 wherein said first body portion includes an opening formed by two walls and said passive valve includes a slot, wherein said passive valve is positioned in said first body portion such that said slot aligns with said opening to deliver said fluid through said valve assembly.

4. The system as recited in claim 2 wherein said body portions are made of stainless steel.

5. The system as recited in claim 1 further including a body portion having an annular protrusion and said passive valve includes an integral o-ring, wherein said integral o-ring contacts said annular protrusion to create a seal.

6. The system as recited in claim 1 further including a fluid container that stores said fluid, and said pump pumps said fluid through said supply line from said fluid container.

7. The system as recited in claim 1 wherein said passive valve includes a slot, and said fluid expands said slot to allow passage of said fluid through said passive valve.

8. The system as recited in claim 1 wherein said supply line is made of stainless steel.

9. The system as recited in claim 1 wherein said passive valve is made of an elastomer.

10. The system as recited in claim 1 further including a temperature sensor, and said pump stops operating when said temperature sensor detects a change in temperature.

11. The system as recited in claim 1 further including a position sensor, and said pump operates when said position sensor detects an object.

12. The system as recited in claim 1 wherein said fluid is mixable with a second fluid in said mixing chamber.

13. The system us recited in claim 12 wherein said fluid is a syrup and said second fluid is a frozen product.

14. A fluid dispending system comprising:
    a pump to pump a fluid through a supply line, and a pressure is applied to said supply line as said fluid flows through said supply line, said pump reversing after pumping of said fluid to remove said pressure in said supply line;
    a valve assembly including a passive valve to dispense said fluid from said supply line;
    a second fluid container that contains a second fluid; and
    a mixing chamber, and said fluid and said second fluid mix in said mixing chamber to form a mixture that is dispensed from said mixing chamber.

15. The system as recited in claim 14 further including a sensor which detects a level of said mixture dispensed from said mixing chamber, and said fluid stops dispensing from said valve assembly when said sensor senses a predetermined amount of said mixture.

16. The system as recited in claim 14 wherein said second fluid continues to dispense after said fluid stops dispensing from said valve assembly.

17. The system as recited in claim 16 wherein said second fluid dispenses for 0.4 seconds after said fluid stops dispensing from said valve assembly.

18. The system as recited in claim 14 wherein said pump reverses for 0.2 seconds after said fluid stops dispensing from said valve assembly to remove said pressure from said supply line.

19. A fluid delivery system comprising:

a fluid container to store a fluid;

a supply line;

a pump to pump said fluid from said fluid container and through said supply line, and a pressure is applied to said supply line as said fluid flows through said supply line, said pump reversing after pumping of said fluid to remove said pressure in said supply line;

a valve assembly to dispense said fluid from said supply line, said valve assembly including a passive valve having a slot, and said fluid expands said slot to allow passage of said fluid through said passive valve;

a second fluid container that contains a second fluid; and a mixing chamber, and said fluid and said second fluid mix in said mixing chamber to form a mixture dispensed from said mixing chamber.

20. The system as recited in claim 19 wherein said second fluid dispenses for 0.4 second after said fluid stops dispensing from said valve assembly.

21. The system as recited in claim 19 wherein said pump reverses for 0.2 seconds after said syrup fluid dispensing from said valve assembly to remove said pressure from said supply line.

22. A method of dispensing a fluid comprising the steps of:

pumping a fluid through a supply line having a pressure;

dispensing said fluid through a valve assembly;

reversing the step of pumping to remove said pressure in said supply line; and mixing said fluid with a second fluid after the step of pumping.

* * * * *